United States Patent [19]

Morishita et al.

[11] Patent Number: 5,040,630
[45] Date of Patent: Aug. 20, 1991

[54] POWER STEERING SYSTEM OF MOTOR DRIVE TYPE

[75] Inventors: Mitsuharu Morishita; Kosaku Uota; Kazuhisa Nishino, all of Hyogo, Japan

[73] Assignee: Mitsubishi Denki K.K., Tokyo, Japan

[21] Appl. No.: 293,037

[22] Filed: Jan. 3, 1989

[30] Foreign Application Priority Data

Jan. 20, 1988 [JP] Japan .................................. 63-11262

[51] Int. Cl.⁵ .....:...................................... B62D 5/04
[52] U.S. Cl. .................................... 180/79.1; 318/434
[58] Field of Search ........................ 180/79.1; 318/434

[56] References Cited

U.S. PATENT DOCUMENTS 4,532,567  7/1985  Kade ............................. 180/79.1 X
4,591,014  5/1986  Yasuda ............................. 180/79.1
4,598,787  7/1986  Drutchas ......................... 180/79.1
4,611,682  9/1986  Yasuda ............................. 180/79.1

Primary Examiner—Charles A. Marmor
Assistant Examiner—Alan M. Kagen
Attorney, Agent, or Firm—Sughrue, Mion, Zinn, Macpeak & Seas

[57] ABSTRACT

The power steering system of this invention has a motor which provides auxiliary torque for the steering shaft to assist in steering.

The maximum level of the motor current is varied in response to the mean motor current at predetermined intervals of time so as to regulate the maximum motor current and thereby prevent overheating or burning of the motor when, for example, the steering wheel is held for a long time in an extreme position.

2 Claims, 6 Drawing Sheets

POWER STEERING SYSTEM OF MOTOR DRIVE TYPE

TECHNICAL FIELD

This invention related to a power steering system designed for an automobile, more particularly, to a power steering system with a motor which provides auxiliary power for a steering system to assist in steering.

BACKGROUND ART

A conventional system of the above described type is arranged to have a motor which provides auxiliary power used to assist in steering for a steering shaft of a rack steering gear via a speed reduction system by way of a transfer mechanism such as a gear or a belt.

However, the above described coventional system involves the problem that the motor generates excessive heat due to the considerable amount of current continuously flowing therethrough and this may in turn generate smoke or unpleasant smells from the motor and may eventually cause critical damage if the motor suffers from burning at such times as when the steering wheel is held for a long period of time at its extreme positions when fully rotated while the vehicle is stationary and when a lot of time is used in putting a car into a garage.

DISCLOSURE OF THE INVENTION

In view of the foregoing, an object of this invention is to provide a power steering system of a motor drive type which will never encounter the above problems of excessive heat being generated by the motor, smoke emanating from the motor, burning of the motor or the like.

A power steering system in accordance with this invention is characterized in comprising means for regulating a maximum level of the motor current in relation to the mean motor current measured at every predetermined intervals of time during a period of continuous flow of current through the motor exceeding a predetermined period of time.

BRIEF DESCRIPTION OF THE DRAWINGS

An embodiment of the invention will now be described, by way of an example, with reference to the accompanying drawings in which.

BEST MODE FOR CARRYING OUT THE INVENTION

Figure 1:
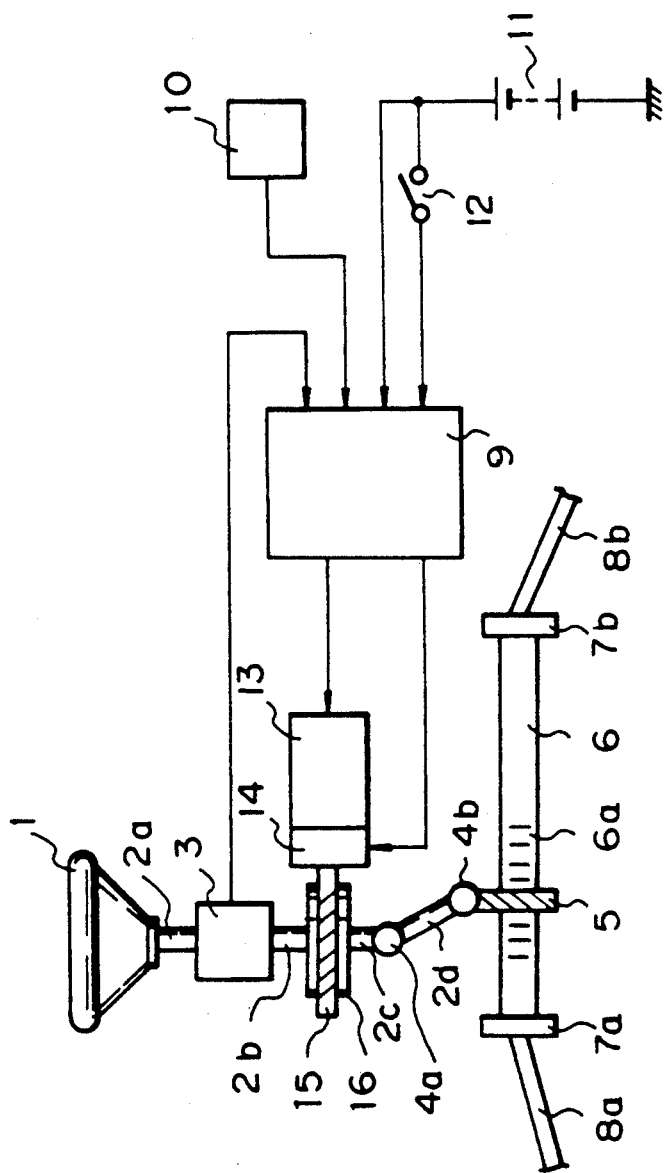
FIG. 1 is a schematic block diagram of the power steering system in accordance with this invention.

Referring to FIG. 1, a numeral 1 denotes a steering wheel which is manually turned by a driver, numeral 3 denotes a torque sensor connected to the steering wheel 1 via a first steering shaft 2a and adapted to output an electrical signal indicating the magnitude of torque applied to the steering wheel 1, numeral 16 denotes a worm wheel connected to the torque sensor 3 via a second steering shaft 2b, numeral 4a denotes a first universal joint connected to the worm wheel 16 via a third steering shaft 2c, numeral 4b denotes a second universal joint connected to the first universal joint 4a via a fourth steering shaft 2d, numeral 5 denotes a pinion shaft physically connected to the seocnd universal joint 4b, numeral 6 denotes a shaft with a rack steering gear 6a meshing with the pinion shaft 5, numeral 7a denotes one ball joint connecting one end of the rack shaft 6 with one of tie rods 8a, numeral 7b denotes the other ball joint connecting the other end of the rack shaft 6 with the other tie rod 8b, numeral 9 denotes a control unit, numeral 10 denotes a speed sensor for detecting vehicle speed, numeral 11 denotes a battery, numeral 12 denotes a key switch, numeral 13 denotes a DC motor with shunt coils or field magnets which is actuated under the contorl of the control unit 9, and numeral 14 denotes an electromagnetic clutch for making physical connection or disconnection between the motor 13 and a worm shaft 15 in accordance with a signal provided from the control unit 9. The worm shaft 15 is designed to mesh with the worm wheel 16.

Figure 2:
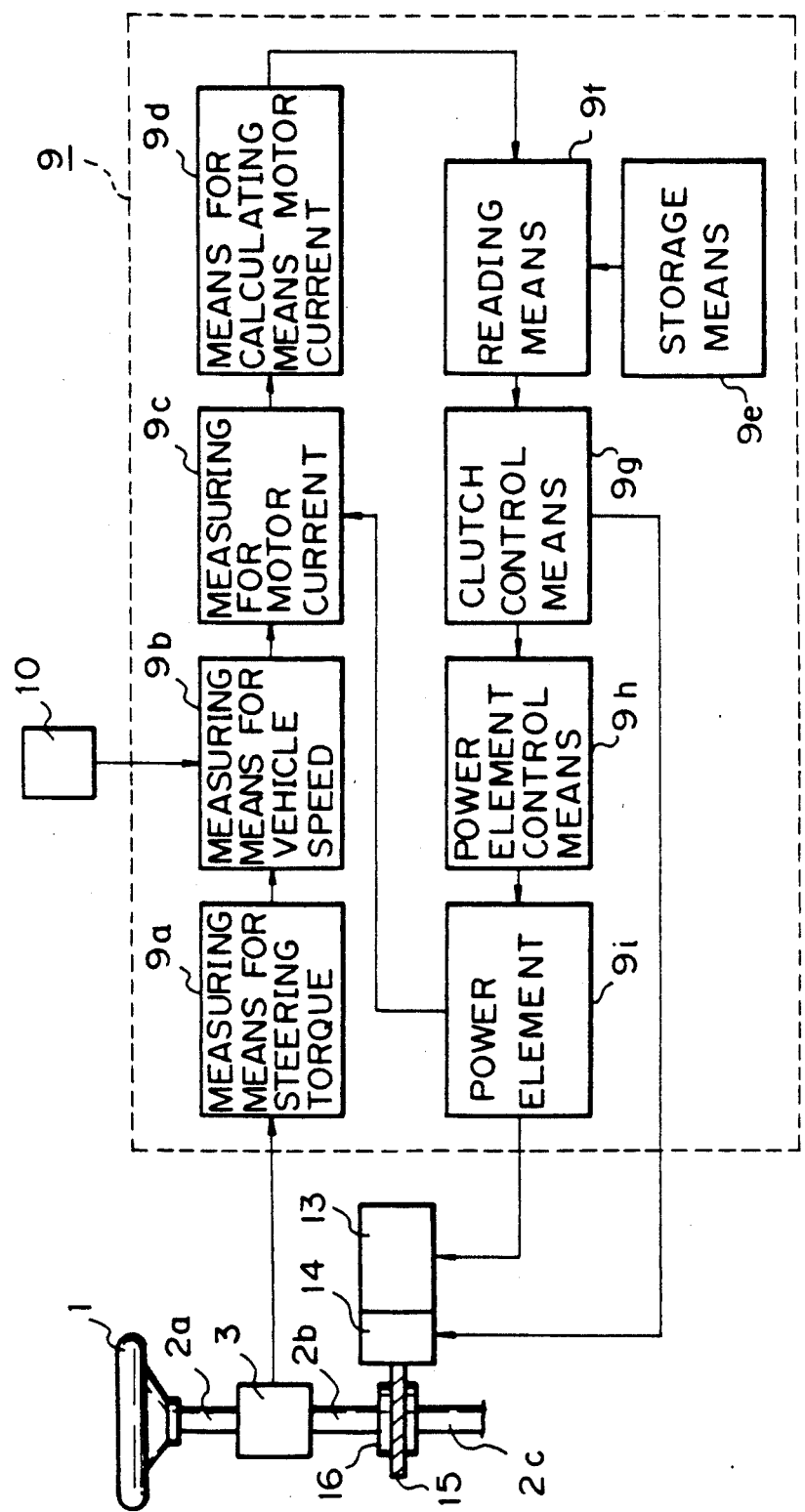
FIG. 2 is a schematic block diagram of the control unit for the power steering in accordance with this invention.

Referring to FIG. 2, which schematically shows the construction of the control unit 9, a numeral 9a denotes measuring means for determining steering torque on the basis of an input signal from the torque sensor 3, numeral 9b denotes measuring means for determining vehicle speed on the basis of an input signal from the speed sensor 10, numeral 9c denotes measuring means for determining the amount of electrical current flowing through the motor 13 on the basis of an output signal from a current sensor provided in a power element 9i for actuating the motor, numeral 9d denotes calculating means for calculating a mean value for the motor current flowing through the motor during a predetermined period of time on the basis of an output signal from the measuring means 9c, numeral 9e denotes storage means in which data on the current to be applied to the motor are stored in association with values for the steering torque, the vehicle speed and the mean motor current, numeral 9f denotes reading means for reading the current data from the storage means 9e on the basis of the measured steering torque, the measured vehicle speed and the calculated mean motor current, numeral 9g denotes clutch control means for energizing or de-energizing the electromagnetic clutch 14 in line with conditions determined at least by the vehicle speed, and numeral 9h denotes power element control means for commanding to the power element 9i to control the magnitude and directions of the motor current on the basis of the data read by the reading means 9f. The power element 9i controls the magnitude and directions of the motor current under the control of the means 9h.

Figure 3:
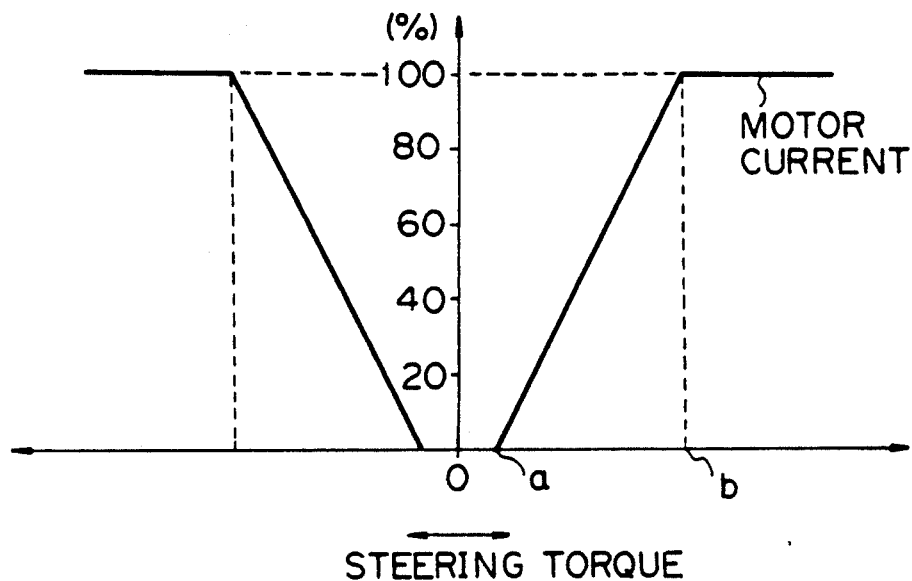
FIG. 3 is a graph in accordance with this invention showing the relationship between steering torque and motor current control.

Reference should now be made to FIGS. 3–6 in reading the following description of the operation of the above described system. When the key switch 12 is set in the "on" position so as to start an engine, the clutch 14 is energized or turned on, which results in mechanical connection of the motor 13 to the worm shaft 15. In this state, the control unit 9 controls the motor current flowing through the motor 13 as viewed in FIG. 3 on the basis of the torque applied to the steering wheel 1. In FIG. 3, as the clockwise torque applied to the steering wheel increases, the motor 13 starts to be actuated at the point a; then the motor current increases linearly; and then the motor current levels off at 100 percent of the rated motor current after the torque exceeds the point b. Conversely, as the torque decreases from a point above the point b, the motor current starts to decrease at the point b and then the motor is turned off at the point a. This control of the motor current is also true in the case of applying counterclockwise torque to the steering shaft.

The output torque of the motor 13 is substantially proportional to the magnitude of the motor current applied thereto. Since an increase in torque applied to the steering wheel above the point a of FIG. 3, at which point the motor 13 is turned on, leads to an increase in the motor current, any increase in torque applied to the steering wheel leads to an increase in the output torque of the motor applied to the worm shaft 15. Thus, the motor 13 applies auxiliary torque to the steering shafts 2a-2d via the electromagnetic clutch 14, the worm shaft 15 and the worm wheel 16 in response to the torque applied to the steering wheel 1 by a driver. The amount of torque that needs to be applied to the steering wheel 1 can be reduced by the same magnitude as that of the auxiliary torque supplied by the motor.

The motor current is monitored on a regular basis, for example, every 1-100 msec, and these monitored values of the motor current are accumulated. On the basis of this accumulated data, the mean motor current is calculated on a regular basis, for example, every 30 sec -3 min. If the mean motor current is above, for example, 60-80 percent of the rated motor current, a maximum motor current which is indicated by the control unit 9 and by which the maximum level of the motor current actually flowing through the motor is regulated is reduced by a predetermined value, for example, 5-10 percent of the rated motor current, as shown on the lefthand side of FIG. 5. If the mean motor current of the next period is still above the aforementioned value, a further reduction by the same predetermined value in the indicated maximum motor current is effected. The same reduction is repeated until the mean motor current is below, for example, 50 percent of the rated motor current, at which level continuous flow of current would never cause any damage to the motor 13 or the power element 9i in the control unit 9. Conversely, if the mean motor current so calculated is below, for example, 40 percent of the rated motor current, the maximum motor current indicated is raised by the same predetermined value, as shown on the righthand side of FIG. 5. As long as the mean motor current remains low, the indicated maximum motor current is repeatedly raised until the initially indicated maximum motor current is attained and the current is held at this initial value. If the mean motor current calculated lies in between, for example, 30 and 70 percent of the rated motor current, the indicated maximum motor current is maintained at its existing level. What has been explained so far is directed to the situation where the vehicle is stationary.

Figure 4:
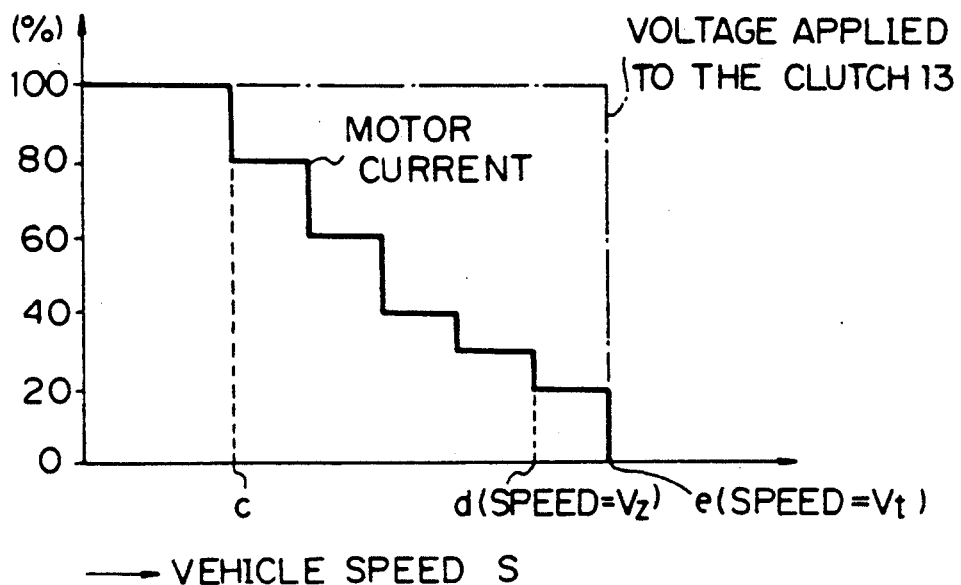
FIG. 4 is a graph in accordance with this invention showing the relationship between a vehicle speed, motor current and electrical voltage applied to an electromagnetic clutch.
Figure 5:
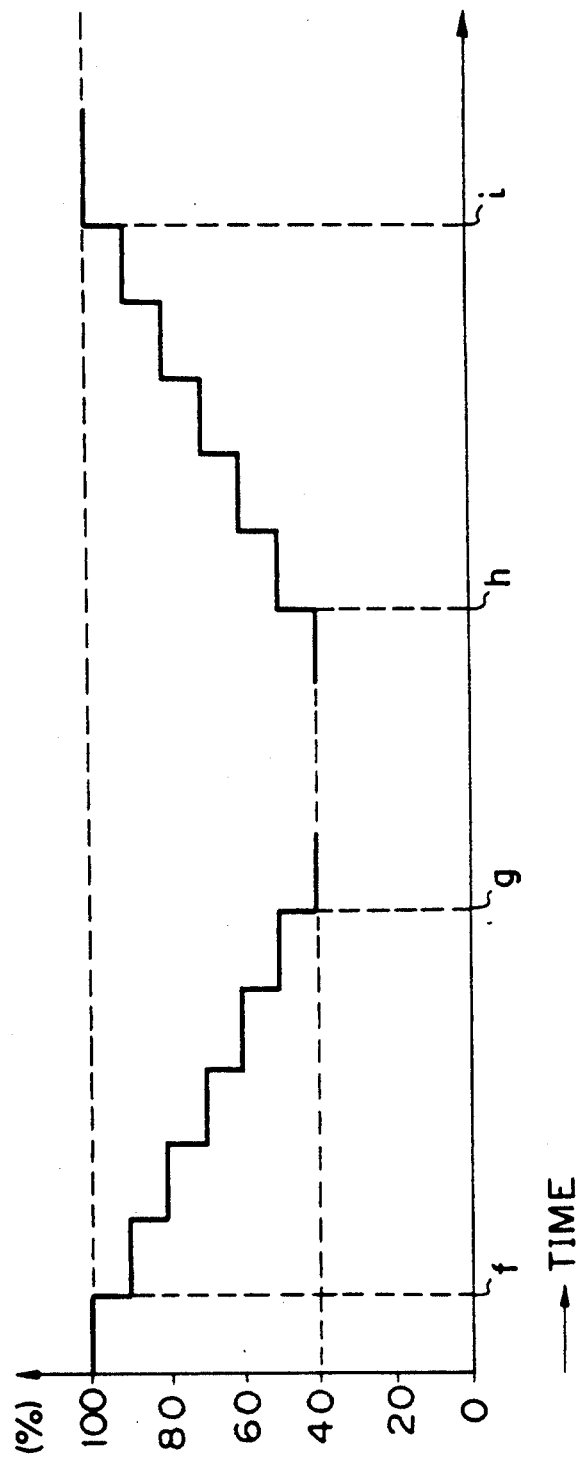
FIG. 5 is a graph in accordance with this invention showing the transition of indicated maximum motor current controlled on the basis of the mean motor current.

During cruising, the motor current is controlled as shown in FIG. 4 on the basis of a value $I_{M1}$ which is stored in advance in association with the steering torque and the vehicle speed, that is, the value $I_{M1}$ is defined in association with the steering torque, the vehicle speed and the mean current under the condition that the vehicle speed is lower than that expressed by the point c in FIG. 4; the the current supplied to the motor is reduced as the vehicle speed increases under the condition that the vehicle speed lies in between the point c and the point d (indicating speed $V_2$); the value $I_{M1}$ is fixed at a constant value $I_{OF}$ under the condition that the vehicle speed lies in between the point d and the point e (indicating speed $V_1$); and under the condition that the vehicle speed is greater than the point e, no current is supplied to the motor 13 or the electromagnetic clutch 14, which is followed by disconnection of the motor 13 from the worm shaft 15 whereupon the driver must handle the steering wheel 1 without the help of the auxiliary torque normally provided by the motor.

Figure 6:
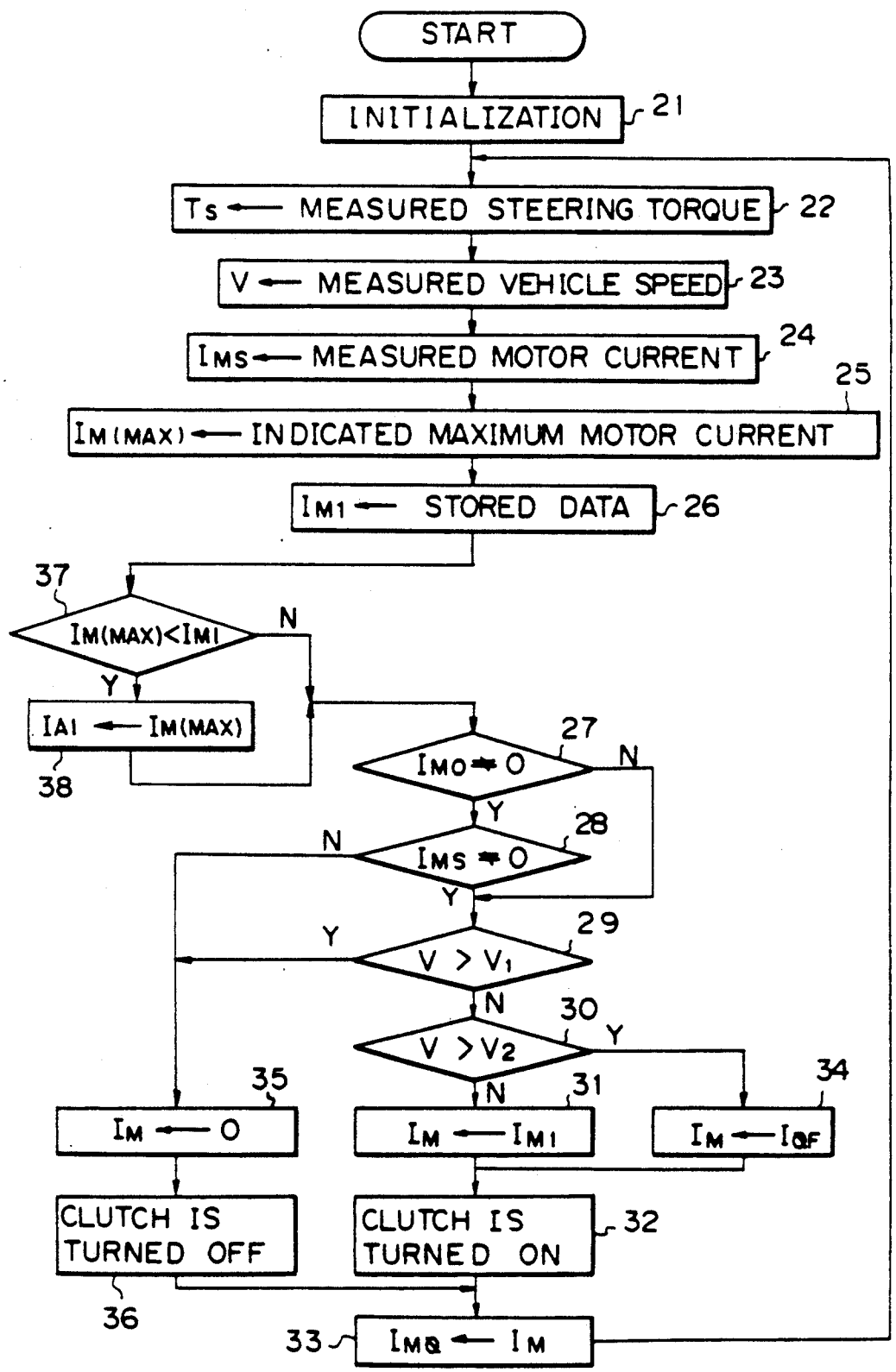
FIG. 6 shows a main routine of a control unit of this invention.
Figure 7:
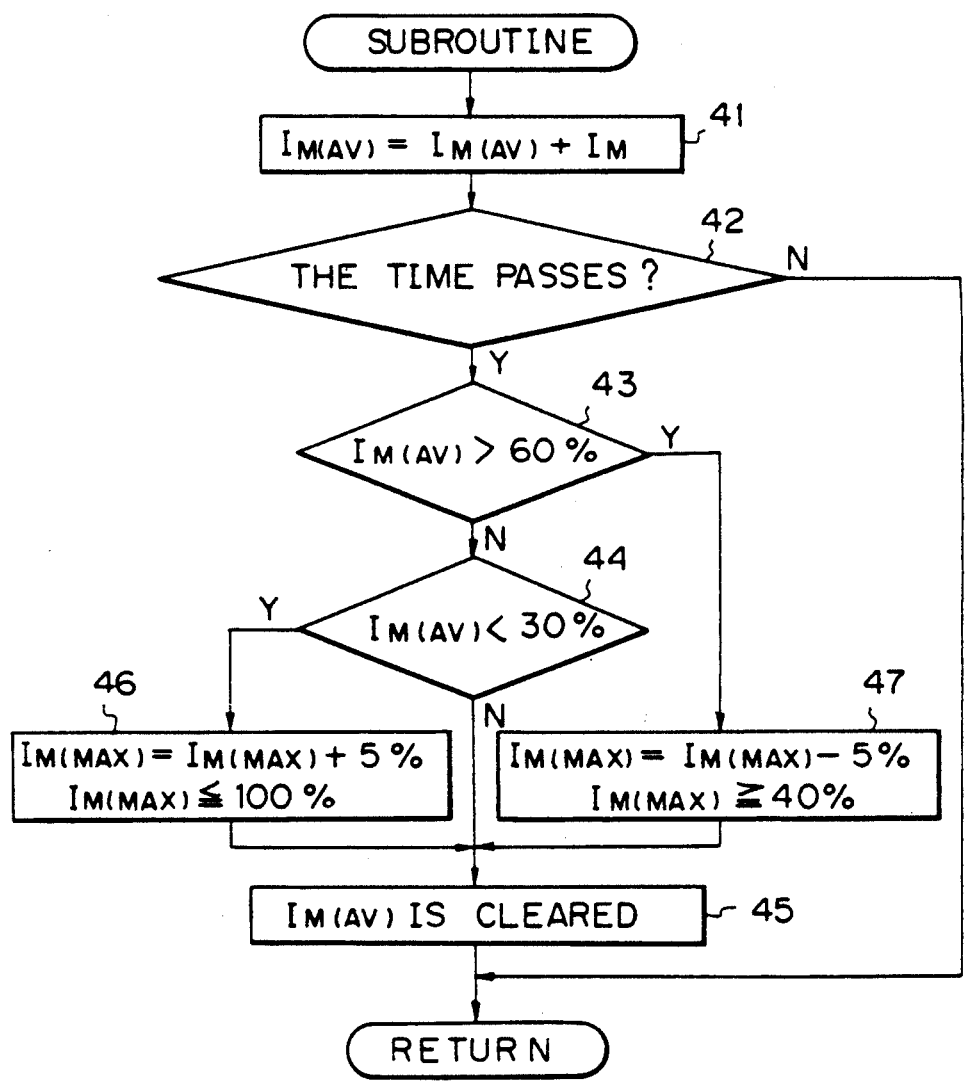
FIG. 7 shows a sub routine of a control unit of this invention.

Reference should now be made to FIGS. 6 and 7 in reading the following description of the operation of the control unit 9. Initialization of the unit 9 is performed in step 21 and then a variable $T_S$ is defined as the value of the measured steering torque in step 22, a variable V being defined as the value of the measured vehicle speed in step 23. A variable $I_{MS}$ is defined as the value of the measured motor current in step 24. Then, in step 25, a variable $I_{M(MAX)}$ is defined as the indicated maximum motor current which is determined on the basis of the mean motor current in the way shown in FIG. 7. A variable $I_{M1}$ is defined as the motor current value which is read from the storage 9e with reference to the measured steering torque, the measured vehicle speed and the calculated mean motor current in step 26. Then, comparison between $I_{M(MAX)}$ defined in step 25 and the variable $I_{M1}$ defined in step 26 is made in step 37. If $I_{M(MAX)}$ is not less than $I_{M1}$, then further judgment is made in step 27. Otherwise, the value of variable $I_{M(MAX)}$ is moved to the variable $I_{M1}$ in step 38. Then, judgement is made in step 27 on the variable $I_{MO}$ which was defined in the last cycle and, as long as the variable $I_{MO}$ is not zero, further judgement is made in step 28 on the variable $I_{MS}$ which was defined as the measured motor current in this cycle. As long as the variable $I_{MS}$ is not zero, further judgement is made on the variable V in steps 29 and 30. If $V<V_2$, the variable $I_M$ is defined as the read current value of the variable $I_{M1}$ in step 31. The variable $I_M$ indicates the amount of electrical current to be applied to the motor 13. The clutch 14 is energized in step 32 and then the variable $I_{MO}$ is defined as the value of the variable $I_M$ in step 33, the process of the control unit 9 then going back to step 22. If the result of the judgement made in steps 29 and 30 is $V_2<V<V_1$, the variable $I_M$ is defined as the value of the variable $I_{M1}$ (which now has the constant value $I_{OF}$) in step 34 and the clutch 14 is then energized, the variable $I_{MO}$ being defined as the value of the variable $I_M$ (now, $=I_{OF}$) and then the process then going back to step 22.

If the judgement made in step 27 results in $I_{MO}=0$, the process jumps to step 29 where the judgement on the vehicle speed is made. If $I_{MO}\neq 0$ in step 27 and $I_{MS}=0$ in step 28, or if $V>V_1$ in step 29, the variable $I_M$ is defined as zero in step 35 and the clutch 14 is turned off in step 36, the variable $I_{MO}$ being defined as the value of the variable $I_M$ (=0) in step 33 and the process then going back to step 22.

Referring to FIG. 7 showing a subroutine with steps for calculating the mean motor current which called for in step 25 of FIG. 6, a variable $I_{M(AV)}$ is defined in step 41 as the result of the calculation of the mean motor current of the variable $I_{M(AV)}$ in the last cycle which is more than the value of the variable $I_M$. Judgment is then made in step 42 as to whether the predetermined period of time (T) has passed. The process returns to the main routine as shown in FIG. 6 provided that this amount of time (T) has not yet passed. Otherwise, further judgment is made on the variable $I_{M(AV)}$ in steps 43 and 44. If the value of the variable $I_{M(AV)}$ lies between 30 and 60 percent of the rated motor current multiplied by T, the variable $I_{M(AV)}$ is cleared in step 45 and then the process returns to the main routine. If the judgment reveals that the variable $I_{M(AV)}$ is below 30 percent of the rated motor current multiplied by T, the indicated maximum motor current is raised by 5 percent of the rated motor current in step 46 and then the variable $I_{M(AV)}$ is cleared in step 45, whereupon the process returns to the main routine. If the judgment shows that the variable $I_{M(AV)}$ is above 60 percent of the rated motor current multiplied by T, the indicated maximum motor current is reduced by 5 percent of the rated motor current in step 47 and the variable $I_{M(AV)}$ is cleared, the process then returns to the main routine. As has been mentioned above, the indicated maximum motor current is varied in response to the mean motor current calculated as long as the motor current continues to flow in order to regulate the maximum level of motor current so that the motor does not encounter any problems with respect to overheating, smoking or burning when, for example, the steering wheel is held for a long time in an extreme position while the vehicle is stationary.

What is claimed is:

1. A power steering system of a motor drive type comprising:
    a torque sensor for detecting steering torque;
    a motor for providing auxiliary torque for a steering shaft of the steering system;
    a control unit for actuating the motor in response to the steering torque; and
    motor current control means, operable when current continues to flow through the motor for a predetermined period of time, for regulating the maximum level of motor current in accordance with the mean motor current determined at predetermined intervals of time wherein said motor current control means decreases said maximum level by a predetermined value if the mean motor current is above a first level; increases said maximum level by a predetermined value if the mean current is below a second level; and maintains said maximum level at its existing level if the mean current lies between the first and the second levels, wherein said first and second levels correspond to safety levels at which the motor current will not cause harm to the motor.

2. A power steering system as claimed in claim 1 wherein said predetermined value is 5 percent of the rated current of said motor, said first level is 60 percent of said rated current and said second level is 30 percent of said rated current.

* * * * *